(12) United States Patent
Dumoulin et al.

(10) Patent No.: US 9,846,029 B2
(45) Date of Patent: Dec. 19, 2017

(54) LASER SYSTEM WITH A LASER RECEIVER CAPABLE TO DETECT ITS OWN MOVEMENTS

(71) Applicant: LEICA GEOSYSTEMS AG, Heerbrugg (CH)

(72) Inventors: Charles Leopold Elisabeth Dumoulin, Balgach (CH); Anton Kehl, Rüthi (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 362 days.

(21) Appl. No.: 14/384,485

(22) PCT Filed: Mar. 15, 2013

(86) PCT No.: PCT/EP2013/055490
§ 371 (c)(1),
(2) Date: Sep. 11, 2014

(87) PCT Pub. No.: WO2013/135897
PCT Pub. Date: Sep. 19, 2013

(65) Prior Publication Data
US 2015/0092183 A1    Apr. 2, 2015

(30) Foreign Application Priority Data

Mar. 15, 2012 (EP) .................................... 12159573

(51) Int. Cl.
*G01C 3/08* (2006.01)
*G01B 11/14* (2006.01)
(Continued)

(52) U.S. Cl.
CPC ............ *G01B 11/14* (2013.01); *G01C 15/004* (2013.01); *G01C 15/006* (2013.01); *G01C 15/008* (2013.01); *G01P 15/00* (2013.01)

(58) Field of Classification Search
CPC .. G01C 15/004; G01C 15/006; G01C 15/008; G01C 15/00; G01B 11/14
(Continued)

(56) References Cited

U.S. PATENT DOCUMENTS 6,292,258 B1    9/2001   D'alessandro et al.
6,314,650 B1   11/2001   Falb
(Continued)

FOREIGN PATENT DOCUMENTS

CN    2532627 Y    1/2003
CN    1503914 A    6/2004
(Continued)

OTHER PUBLICATIONS

European Search Report dated Jul. 25, 2012 as received in Application No. EP 12 15 9573.

*Primary Examiner* — Mark Hellner
(74) *Attorney, Agent, or Firm* — Maschoff Brennan

(57) ABSTRACT

The invention relates to a laser system (100) comprising a laser receiver (10) and a laser emitter (20) and to a method using this system (100). The laser receiver is designed for locating a laser beam (22) relative to the laser receiver (10) by its laser light photo sensor (1). The laser receiver (10) has an acceleration sensor (4) providing a signal indicating a movement of the laser receiver together with a movement direction and an acceleration of this movement and a circuitry (3) connected to said photo sensor (1) and to the acceleration sensor (4) designed to compute and correlate the signals of photo sensor (1) and acceleration sensor (4) and to weight the information derived from the acceleration sensor (4). Laser receiver and laser emitter of the laser system are both provided with communication means, so that by communicating the weighted information the laser
(Continued)

plane can be adjusted and/or re-adjusted in response to a movement of the leaser receiver.

25 Claims, 4 Drawing Sheets

(51) Int. Cl.
  *G01C 15/00* (2006.01)
  *G01P 15/00* (2006.01)
(58) Field of Classification Search
  USPC ........................................................ 356/4.01
  See application file for complete search history.

(56) References Cited

U.S. PATENT DOCUMENTS

| | | |
|---|---|---|
| 6,934,012 B2 | 8/2005 | Inaba et al. |
| 7,394,527 B2 | 7/2008 | Essling et al. |
| 7,990,550 B2 | 8/2011 | Aebischer et al. |
| 8,404,301 B2 | 3/2013 | Schneider |
| 2001/0004287 A1 | 6/2001 | Ammann |
| 2009/0100901 A1 | 4/2009 | Spalding |
| 2009/0171618 A1 | 7/2009 | Kumagai et al. |
| 2010/0131237 A1 | 5/2010 | Pamatmat |
| 2012/0272537 A1* | 11/2012 | Nishita ................ G01C 15/008 33/293 |
| 2014/0156219 A1* | 6/2014 | Soubra .................. G01C 15/00 702/150 |

FOREIGN PATENT DOCUMENTS

| | | |
|---|---|---|
| CN | 101133341 A | 2/2008 |
| EP | 1 703 300 A1 | 9/2006 |
| EP | 1 988 360 A1 | 11/2008 |
| WO | 02/10681 A1 | 2/2002 |
| WO | 2006/088570 A2 | 8/2006 |
| WO | 2012/059276 A1 | 5/2012 |

* cited by examiner

LASER SYSTEM WITH A LASER RECEIVER CAPABLE TO DETECT ITS OWN MOVEMENTS

FIELD OF THE INVENTION

The present invention relates to a The laser receiver according, a laser system and a method for using a The laser receiver according.

BACKGROUND

Conventional laser receivers are particularly small hand-held devices, which include a display and a laser light photo sensor. In spite of being hand-held laser receivers, those laser receivers are often provided with an adapter in order to be mounted on a tripod or other kind of stand. The photo sensor of the laser receiver typically comprises a zero position. For considering a detected laser beam as to be on-grade, the light of said laser beam has to incident the zero position of the photo sensor. Typically, the photo sensor comprises a plurality of photo sensitive elements providing an electrical output signal when illuminated by the laser beam. Particularly, the photosensitive elements are arranged in a linear array having the zero position usually in the centre of the array. A circuitry included in the laser receiver is connected to the photo sensor and is designed to compute the electronic output signal of the photo sensor. The electronic output signal of the photo sensor indicates the incidence of the detected laser beam relative to the zero position. The circuitry is designed to derive from the electronic output signal of the photo sensor the relative position between the detected laser beam and the laser receiver. In order to find a laser beam by using a laser receiver the laser receiver is moved by the operator slowly through the space the searched laser beam is assumed to be. In case the laser beam hits the photos sensor of the laser receiver, this hit and the position of the hit with respect to the zero position is indicated on the display of the laser receiver, which is connected to the circuitry. The movements of the laser receiver are than concentrated by the operator to the part of space, where the incidence had been indicated, until the laser beam and the laser receiver are indicated on the display or by an acoustic signal as being on-grade.

Most frequently laser receivers of the above described form are used on construction sides collaborating with the rotating laser beam of a rotating construction laser. A laser system comprising such a laser receiver in collaboration with a rotating construction laser is disclosed in U.S. Pat. No. 6,314,650 B1. The laser beam or the laser plane generated by the laser transmitter can be adjusted in response to one or more inputs by a user of the system. The system is operable in different modes, such that communication from the laser receiver to the laser transmitter results in various adjustments to the laser beam or tilt or slope of the plane generated by the rotating laser beam. The system is preferably operable to automatically account for any drift of the beam or laser plane. Further the principal steps of the different modes like plane lock/grade lock (zero-drift or plane adjustment), line lock (target detection mode), laser catching and laser tracking (slope matching: the beam is adjusted to follow the movement of the laser receiver) etcetera are explained in U.S. Pat. No. 6,314,650 B1. However, any mistakes in detecting the elevation of or in adjusting the laser beam or laser plane, respectively, caused by a movement of the laser receiver are not subject matter of U.S. Pat. No. 6,314,650 B1 and are not even mentioned as being a possible problem.

As it can exemplarily be seen by means of U.S. Pat. No. 6,314,650 B1, it is usually assumed that during the collaboration of laser receiver and laser beam or laser plane, especially during grade lock/plane lock modes, the position of the laser receiver remains stable, whereas the position and direction of the emitted laser beam may drift over time, particularly due to temperature changes. The emitted laser beam is then re-adjusted for compensation of such drift, particularly for meeting the zero position of the laser receiver with the generated laser beam or laser plane, respectively. However, the correction is false when the laser receiver tilts or moves.

U.S. Pat. No. 6,292,258 B1 recognized at least that a tilt of the laser receiver can influence the precision of a detected elevation of a rotating reference laser beam. In order to solve the recognized problem U.S. Pat. No. 6,292,258 B1 provided a laser receiver equipped with a laser beam detection unit provided with a laser light photo sensor with a plurality of photosensitive elements arranged in a (linear) array, capable of delivering an elevation signal indicative of an elevation of a laser beam relative to the laser receiver, and provided with an inclination sensor providing an electronic signal in case the laser receiver tilts. Thus, the disclosed laser receiver is capable of detecting the presence and elevation of a rotating reference laser beam and of providing an indication of a laser receiver tilt. An integrated circuitry is designed for correcting a generated elevation signal from the photo sensor as a function of the indicated laser receiver tilt. Thus the laser receiver is capable to indicate the user a detected elevation of the laser beam faultless with respect to tilt-faults caused by a tilt of the laser receiver.

However, in cases, where the laser receiver shows other movements than a tilt, these other movements, i.e. sideward or upward or downward movements (sinking in mud) or a combination of these movements with a tilt can not be considered by laser receivers as disclosed in the documents cited above. A correct adjustment or re-adjustment of the laser beam or a correction of the position of the laser receiver in response to a movement other than a tilt of the laser receiver is not possible.

SUMMARY

Some embodiments of the invention provide a laser receiver capable for an accurate indication of the elevation of a laser beam to be detected by the laser receiver even, when the laser receiver is subject of an unintended arbitrary movement. More specifically, some embodiments of the invention to provide a system of a laser transmitter and a laser receiver capable for an accurate detection of an elevation of a laser beam and an accurate adjustment of a laser beam and a laser plane, respectively, independent of a drifting, tilting, or other movement of the laser receiver. Further the laser system should be able to adjust or re-adjust the emitted laser beam rapidly in response to the movement of the laser receiver.

The laser receiver according to the invention is designed to detect a laser beam, in particular the rotating laser beam of a rotating construction laser designed to generate a laser light plane by emitting a rotating laser beam. The laser receiver comprises a laser light photo sensor having a zero position. Said laser light photo sensor providing an electrical output signal when illuminated by a laser beam. The laser receiver further comprises an acceleration sensor, which is designed to provide an electrical output signal indicating a movement of the laser receiver together with an indication of a direction and an acceleration of this movement. Said photo sensor and said acceleration sensor are connected to a circuitry. Said circuitry is designed to derive a relative position between the detected laser beam and the zero position of the photo sensor and based on this to derive a relative position between the laser beam and the laser receiver. Further said circuitry is designed to weight the information derived from the electrical output signal of the acceleration sensor and to initiate an automated action adapted to said weighted information. Further the laser receiver comprises output means and optionally input means connected to the circuitry in order to communicate with a user.

The invention enables to determine the relative position of the emitted laser beam accurately. Any faults caused by a movement of the laser receiver—tilt, slow drift or fast movement sideward, upward, downward and combinations thereof—can be avoided by providing the laser receiver with an acceleration sensor and with an circuitry designed to consider the information of the acceleration sensor in a suitable way. Thus a user of the laser receiver according to the invention is capable to adjust or re-adjust the laser beam, without a falsification by not considered movements of the laser receiver.

Particularly, the circuitry of the laser receiver is designed to provide a correlation signal correlating electrical output signals from the acceleration sensor with electrical output signals from the photo sensor.

In a preferred embodiment the laser light photo sensor has a linear array of photosensitive elements and the zero position is located at the linear array of photosensitive elements, in particular in the center of the linear array. The photo sensitive elements of the laser light photo sensor are preferably photodiodes, in particular avalanche photodiodes.

In a further preferred embodiment the acceleration sensor is designed as a three-axis acceleration sensor, to detect movements and accelerations of the laser receiver in three different directions, in particular spatial directions, so that the movement can be indicated in a Cartesian coordinate system.

Providing two independent signals from the laser receiver, namely from the photo sensor and from the acceleration sensor, the detection of a movement, as well as an acceleration and direction of such movement, of the laser receiver with respect to the laser plane is enabled, requiring only a single laser beam strike over the photo sensor with only a single (not spatially resolving) photo sensitive element.

This is a considerable advantage, i.e. when searching for the laser beam or during catching and tracking mode (see below). During the catching mode the user tries to catch the laser beam in order to lead the laser beam after successful catching to a predetermined position in space by using the tracking mode. During the tracking mode the laser beam follows the moving laser receiver until the tracking mode is deactivated and by this can be easily be brought in a predetermined position/elevation. It can be understood that those operations can be carried out more easily and accurately by an automated correction of unintended tilt of the laser receiver and by that, i.e. facilitating an adjustment of the laser light plane on a construction side. A very user friendly version of the laser receiver provides a circuitry that is pre-programmed with various selectable weighting criteria, so that the user can determine how accurate the laser receiver should work or how sensible the laser receiver should act with respect to movements. For this purpose the circuitry can also be designed programmable, so that the user can program the circuitry by the means of input means with respect to the weighting criteria according to his current requirements, i.e. the sensitivity for movements in one direction can be less than in another direction.

The laser receiver preferably comprises at least one output means, wherein the output means can be a display and/or a loud speaker and/or communication means in form of a transmitter unit for sending or a transceiver unit for receiving and sending communication signals. It is understood that these communication means are preferably designed for remote, i.e. wireless, communication, but also can include communication by means of a cable connection.

By means of the display the user can be informed about the relative position between the laser receiver and the laser beam detected by the laser receiver, or in case the absolute elevation over an interesting ground of the laser receiver is known the elevation of the laser beam or the laser light plane, respectively over this ground or a base known in its relative elevation to this ground can be provided to the user on the display. Further the current movement sensitivity/weighting criteria of the laser receiver and/or a possible movement including acceleration and direction of the movement can be indicated to the user on the display.

The incidence of the laser beam at the zero position of the photo sensor of the laser receiver can be indicated by an acoustic signal provided to the user by the means of a loud speaker. In case of considerable and/or fast movements an acoustic signal can be provided to the user by the means of a loud speaker, like an acoustic alert.

Communication signals indicating movement, incidence of a laser beam on the photo sensor or other messages including "command signals" can be provided to the laser emitter or to a central computer or to an external control unit, i.e. a computer or control unit placed anywhere on the construction side, by using the communication means of the laser receiver. In case the communication means is a transceiver, programming of the circuitry with respect to weighting criteria or selection/activation/deactivation of operating modes (see below) can be done by sending programming signals to the laser receiver, i.e. from a central computer or an external control unit.

In an advantageous embodiment of the laser receiver the circuitry is designed to work at least one operating mode, wherein the operating mode is activatable and de-activatable or selectable by the means of input means. The operating mode can be i.e. a grade lock mode, a line lock mode, a plane lock mode, a tracking mode, a beam catching mode as they are described in their principals in U.S. Pat. No. 6,314,650 B1. It further can be designed to work a laser control mode.

Running in the laser control mode, the circuitry is designed for sending "command signals" derived from the electrical output signals of the acceleration sensor or sending the electrical output signals of the acceleration sensor to the connected communication means of the laser receiver. Such a configuration of the laser receiver is preferably used in collaboration with a laser emitter having a receiver unit for receiving the communicated signals transmitted by the communication means of the laser receiver. The communication means of the laser emitter as well as those of the laser receiver are preferably designed for remote, i.e. wireless, communication.

A typical collaboration between a laser receiver and a laser emitter is defined in a laser system. Such a laser system serves preferably for generating a reference laser light plane and comprises a laser receiver and a laser emitter, preferably a rotating construction laser designed to provide a laser light plane upon rotating the emitted laser beam. The laser system according to the invention comprises a laser receiver according to any of the embodiments described above and having at least a communication signal transmitter unit. The rotating construction laser of the laser system further is provided with at least a communication signal receiver and a control unit connected to the communication signal receiver in order to work the incoming communication signal.

It can be easily understood that a laser system comprising a laser receiver according to the invention allows a more accurate and more efficient installation of a reference laser light plane on a construction side and also facilitates monitoring and more accurate re-adjustment of the laser light plane if necessary.

In a preferred embodiment the control unit of the laser emitter included in the laser system is provided with an adjustment unit, which is capable of adjusting a rotating speed of the reference laser beam generated by the rotating construction laser and/or a tilt of the reference light plane generated by the rotating laser beam and/or an elevation of the reference light plane and or the focus of the emitted laser beam and/or the intensity of the laser light output.

In case the control unit is further designed to allow an adjustment in correlation with "command signals" received from the laser receiver or in correlation with movements of the laser receiver, in particular with accelerations and directions of movements of the laser receiver the adjustment can be obtained by one user only or fully automated. The latter one is of particular interest in monitoring situations like grade lock, plane lock, line lock. In all cases the accuracy of the adjusted laser beam is very high, because any movement of the laser receiver can be accounted.

In case the laser emitter and the laser receiver each are provided with a communication transceiver for receiving and transmitting communication signals, information about the adjustment operations of the laser emitter can be transmitted from the laser emitter to the laser receiver and subsequently can be delivered to the user by means of the output means of the laser receiver, in particular on the display. Accomplishment of an adjustment operation of the laser emitter can by this means be indicated by an acoustic signal to a user of the laser receiver.

Another preferred embodiment of the laser system comprises a rotating construction laser with a switchable lens and/or a motor-controlled collimating lens and/or a liquid lens for varying focusing or defocusing of the reference laser beam.

This is particularly useful for either increasing the visibility of the reference laser beam at close distances, with a sharper focus, or extending the range of distances over which the reference laser beam can be detected with a more defocused laser beam. Such a defocused laser beam with a larger spot size on a target is also beneficial for searching/catching/tracking applications.

In another preferred embodiment the rotating construction laser is provided with filter means for varying the intensity of the emitted laser light.

Particularly, the laser receiver is provided with output means, and optionally with input means, for sending commands to the laser in order to effect a focusing or defocusing of the reference laser beam.

Using the variability of the focus of the laser beam and/or the variability of the intensity of the emitted laser light allows the use of the laser beam in an increasing number of situations, as the intensity and/or the focus can be adapted to the current requirements, the lighting conditions of the environment and the distance to the laser emitter of the location the laser beam is used.

According to one embodiment of the invention, the laser receiver and/or the laser are provided with input means for sending commands in order to effect a focusing or defocusing of the reference laser beam and/or a movement of the reference laser beam in upward or downward direction, wherein rotation speed of the rotating laser beam and direction of the movement of the reference laser beam is correlated with signals from the acceleration sensor. Further the laser emitter can be provided with means for restricting the extent of the laser plane, in particular by beam masking or by limiting a pendulum motion of the laser beam between pre-defined end points. This is of advantageous when a visible laser line is required, i.e. at a wall and can be used in connection with line lock mode and filtering and/or focusing adjustments.

The input means of the laser receiver and/or the laser may be provided in a manner similar to the design of known computer game control devices. Buttons, a joystick or touch-screen symbols may be provided indicating directions and/or speed of the movement of the reference laser beam and allowing for user inputs for laser beam adjustment. Upon short activation of an input command, the responding adjustment speed may be slow, but increase with longer activation of the input command.

During monitoring, line lock, grade lock, plane lock mode it can happen that the laser receiver loses optical contact with the laser emitter by a very fast unintended movement of the laser receiver. In such a case the possibility to determinate the direction of a movement of the laser receiver with respect to the laser plane caused by the combination of the acceleration sensor with the photo sensor of the laser receiver facilitates the search of the laser receiver by the laser emitter. Particularly, the redirection of the laser beam into a direction where the laser receiver has left the laser plane is facilitated and can be further accelerated, i.e. by pro-actively increasing the rotation speed of the laser beam.

A search for a lost laser receiver can even fully automated, if the control unit of the laser emitter is provided with a search functionality enabling a reorientation of the laser beam. The search functionality may, e.g., enable to increase automatically the rotation speed of the laser beam and/or initiate a tilt and/or upward or downward movement of the generated laser plane into the direction the laser receiver leaves the laser plane.

The laser receiver and, optionally also, the laser may further be provided with compasses for facilitating a search for the laser receiver in an azimuthal direction, using that the laser receiver is typically aligned within 45° vertical angular direction with respect to the direction of the reference laser beam. Further wireless position-determining methods, such as GPS, may be applied. Furthermore, for allowing simultaneously a distance measurement, the laser receiver is preferably provided with a distance measurement device, typically then with an electronic distance measurement device.

A preferred method to determine the precise distance between laser receiver and laser emitter is the time of passing method, which requires that the receiver orientation is reasonably aligned to the rotator. A simple method to achieve the alignment, is to change the orientation of the receiver in such a manner that the distance measured and indicated to the user, is the shortest (receiver is orthogonal/perpendicular to the incoming laser beam). Other methods to ensure alignment of the receiver and the laser emitter are well known in the art.

Knowing the precise distance between the laser receiver and the laser emitter, the number of planes required to determine the receiver position can be reduced by 1 (for equations 1, 2 and 3). In addition, reducing the number of planes required to determine the position and or orientation of the receiver reduces the motion uncertainty of the moving receiver.

Knowing the precise direction and distance, stake out applications are possible.

An often needed information on a constriction site is the distance between the ground and the laser receiver, called ground height of the receiver. Typically the ground height of the receiver is measured by reading the height of the receiver mounted to a measurement staff. Many systems have been disclosed to automate the ground height measurement, e.g. by using ultrasonic equipment or a rangefinder directed to the ground.

Using a laser system according to the invention comprising a laser rotator and a laser receiver with a linear photo sensor and with an acceleration sensor, allows an alternative way to determine the ground height. In case the receiver is mounted on a pole having its foot inclinable fixed on the ground in a pivot point, determining the ground height means determining the distance of a marking, preferably the zero position c of the photo sensor of the receiver, to the unknown pivot point.

Operation of the laser receiver according to the invention can be described in general as follows. The laser receiver detects a strike of a rotating reference laser beam on its photo sensor. The photo sensor provides an electrical output signal caused by said illumination to the circuitry of the laser receiver and the circuitry derives a relative position between the detected laser beam and the zero position of the laser receiver. Based on this the circuitry calculates a relative position of the laser beam and the laser receiver, in particular in cases where the zero position and the reference point of the laser receiver are not identical. The acceleration sensor of the laser receiver detects any movement of the laser receiver and provides an electrical output signal to the circuitry indicating said movement and indicating a direction and an acceleration of said movement. The circuitry weights the information derived from the electrical output signal of the acceleration sensor and initiates an automated action adapt to said weighted information.

The weighting of the information derived from the electrical output signal of the acceleration sensor can be dependent on the selected/activated operating mode and/or on the weighting criteria, selected or programmed by the user.

Thereby it is advantageous if at least some of the criteria for weighting the information derived from the electrical output signal of the acceleration sensor are provided as a pre-programmed set of criteria. These set of pre-programmed criteria can be recorded, i.e. in a storage unit of the circuitry or in a separate storage device connected or at least connectable to the circuitry.

At least one of the following operating modes can be selected and/or activated by the user by means of according input means: grade lock mode, line lock mode, plane lock mode, tracking mode, beam catching mode, laser control mode. The steps of the operations behind the mode are given in the above mentioned US-patent and are recorded in a storage unit of the circuitry or in a separate storage device connected or at least connectable to the circuitry.

The automated action initiated by the circuitry and adapt to the weighted information can comprise various actions, namely generating an output signal indicating the derived relative position between detected laser beam and laser receiver, derived from the electrical output signal of the photo sensor and sending it to a connected output means; generating an output signal indicating the derived relative position between detected laser beam and laser receiver, derived from the electrical output signal of the photo sensor and correcting said output signal as a function of the electrical output signal of the acceleration sensor and sending it to a connected output means; sending an alarm signal to a connected output means; sending a command "stop the laser emission" to a connected output means. Those actions can be initiated one by one or in combination dependent on the weighting criteria and/or the selected operation mode. The person skilled in the art knows which actions make sense in which situations so that a detailed description of all possible combinations and dependences are not given herein.

A further method to use the laser receiver according to the invention is for control a laser transmitter, in particular a rotating construction laser, wherein the laser emitter having a receiver for receiving communication signals and the laser receiver having a transmitter for transmitting communication signals. The laser receiver is moved in a predetermined way so that the acceleration sensor provides according electrical output signals indicating the movement together with the movement direction and the movement acceleration to the circuitry or to the output means of the laser receiver, in particular to the communication means of the laser receiver for transmitting the electrical output signals of the acceleration sensor or "command signals" delivered by the circuitry and derived from the electrical output signals of the acceleration sensor to the receiver of the laser emitter. The control unit of the laser emitter, which is connected to the communication means of the laser emitter and designed to work the incoming communication signals is adjusting the functions of the laser emitter by means of its adjustment unit.

BRIEF DESCRIPTION OF THE DRAWINGS

The invention will be explained below with reference to examples of possible embodiments shown schematically in the drawings, in which.

DETAILED DESCRIPTION

Figure 1:
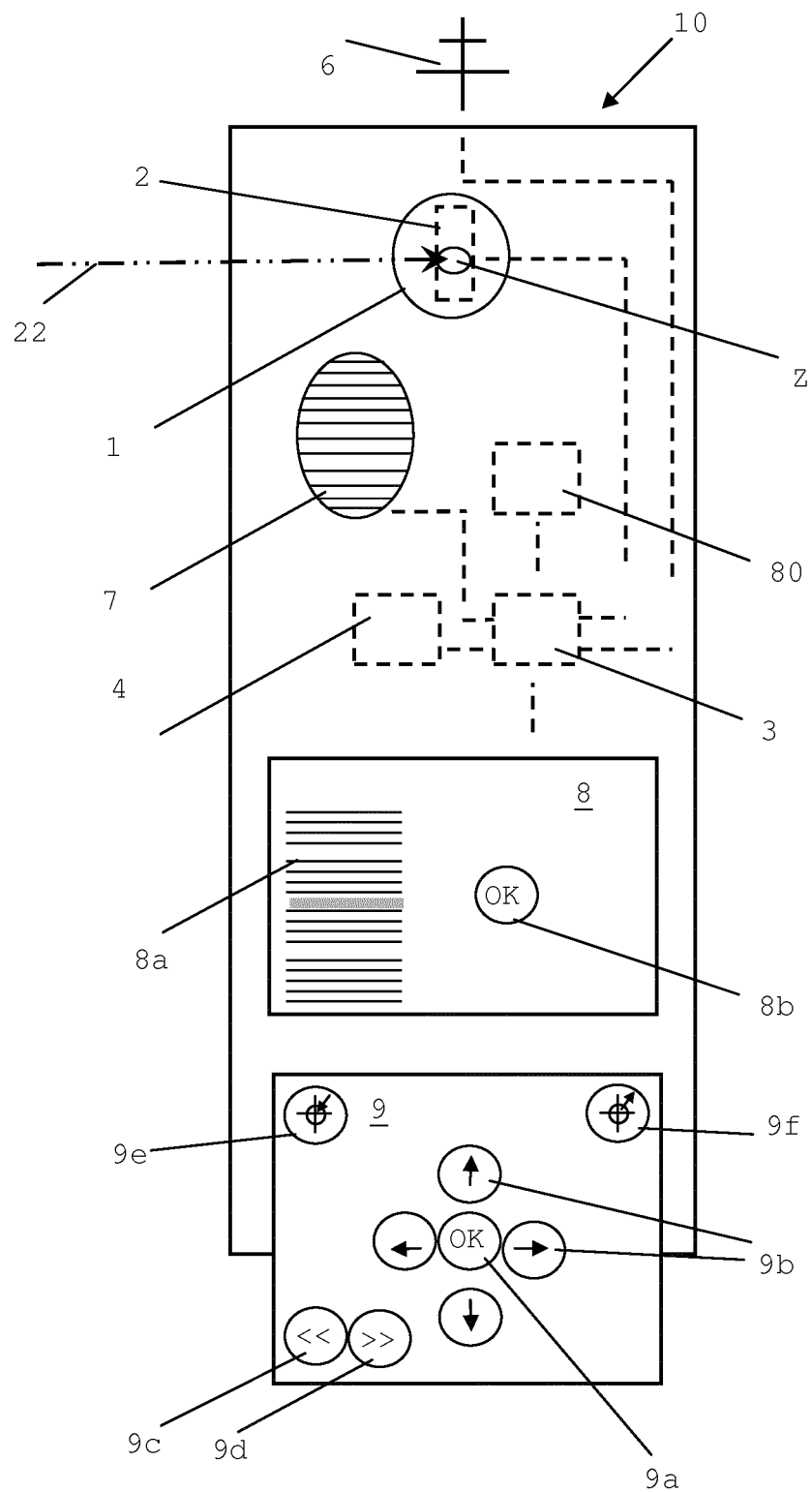
FIG. 1 shows an embodiment of the inventive laser receiver.

FIG. 1 shows an illustration of an embodiment of the inventive laser receiver 10. The laser receiver 10 is designed for detecting a relative position of said laser receiver 10 with respect to a reference laser beam 22 (see FIG. 2), wherein the laser beam is preferably a rotating reference laser beam generated by a rotating construction laser designed to provide a laser light plane 23 upon rotating the emitted laser beam 22. The laser receiver 10 comprises a laser light photo sensor 1 having, in this example a linear array of photo sensitive elements 2. The photo sensitive elements 2 providing an electrical output signal when illuminated by a reference laser beam 22. Located on the linear array of photo sensitive elements 2 is a zero position Z, which should be aligned with the laser beam. In the shown example the zero position Z is in the centre of the linear array. However it could also be located differently. The laser receiver 10 is further provided with an acceleration sensor 4 designed to provide an electrical output signal, when the laser receiver moves. The electrical output signal indicates the movement per se as well an acceleration and a direction of this movement. The photo sensitive elements 2 and the acceleration sensor are connected to a circuitry 3, which is designed to compute and correlate the electrical output signal of the photo sensor and the electrical output signal of the acceleration sensor 4.

The invention enables to locate a laser plane 23 with respect to the laser receiver 10 and thus allowing for an adjustment of the laser plane 23 with respect to the laser receiver 10.

Particularly, the circuitry 3 of the laser receiver is designed to provide a correlation signal correlating electrical output signals from the acceleration sensor 4 with outputs from the photo sensor 1. In particular the circuitry 3 is designed to derive a relative position between the detected laser beam 22 and the zero position z of the laser receiver 10 and the laser receiver 10, respectively, from the electrical output signal of the photo sensor 1. It is further designed to weight the information derived from the electrical output signal of the acceleration sensor and to initiate an automated action adapt to said weighted information. One of these possible actions is, i.e. a correction of derived relative position of laser receiver and laser beam as a function of the electrical output signal of the acceleration sensor. In case of very large or fast movements the automated action can be an acoustic alert signal or a stop command transmitted to the laser emitter, for stopping further adjustment activities of the laser emitter.

As the circuitry is connected to output means 6, 7, 8, namely a display 8, and in this example also a loud speaker 7 and communication means 6, the user can be provided with information according to results of the computing of the circuitry 3 by an output on the display 8 or by an acoustic signal.

Further the raw electrical output signals of the photo sensor or the acceleration sensor or the results of the computing as well as "command" signals derived by this computing can be transmitted to external units like the laser emitter, an external control unit and/or a computer by means of the communication means 6 of the laser receiver. The communication means 6 are preferably designed for remote, i.e. wireless, communication and in this embodiment it is given in the form of a transceiver unit for receiving and transmitting communication signals. However, often it might be sufficient in praxis to provide the laser receiver 10 with a transmitter unit for only transmitting communication signals.

According to a preferred embodiment of the invention, the acceleration sensor 4 is designed as a three-axis acceleration sensor. Thus movements and/or accelerations of the laser receiver 10 in three different directions, in particular spatial directions, can be detected. This facilitates the determination of a direction of a movement of the laser receiver 10 with respect to the laser plane 23.

The circuitry 3 can be designed programmable and can be provided with an integrated storage for recording the program steps or as it is shown in FIG. 1 it is connected to an external storage unit 80 integrated in the laser receiver 10. As an further alternative external storage units like USB-sticks, external hard disks etcetera can be connected to the circuitry 3 of the laser receiver 10 by means of according connectors (not shown). In the shown example operation modes, like grade lock mode, line lock mode, plane lock mode, tracking mode, beam catching mode, laser control mode, and pre-programmed weighting criteria are recorded in the storage unit 80. By means of suitable input means 8, 9 the operation modes can be selected or activated/deactivated, respectively, and pre-programmed weighting criteria can be selected. Those weighting criteria can be e.g. thresholds regarding the movement acceleration and/or the movement velocity and/or the movement distance within a predetermined time of the laser receiver dependent of the movement direction or independent of the movement direction. Another criteria can be a threshold regarding a fault of the determined orientation of the laser plane calculated in dependence of an determined movement of the laser receiver and others. Also further weighting criteria can be programmed by the user according to the current requirements.

Figure 2:
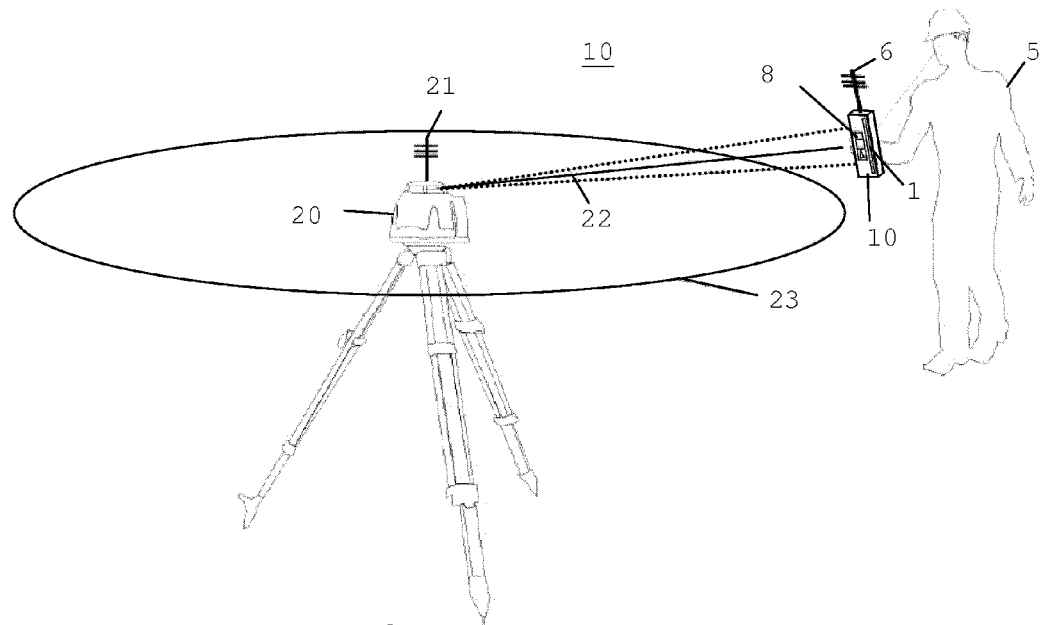
FIG. 2 shows an embodiment of the inventive laser system comprising a laser, emitting a reference laser beam, and an inventive laser receiver.

According to the shown embodiment, the laser receiver 10 is provided with a display 8 allowing for directly reading information from the laser receiver 10 by an operating person 5 (see also FIG. 2). The display 8 in this embodiment is provided as a touch screen display 8, enabling the selection or activation/deactivation of various operating modes as well as selecting or programming weighting criteria and/or sending of commands to other units or to the laser emitter 20, if the laser emitter is provided with means for communicating with the laser receiver 10.

As an example the laser receiver 10, together with its circuitry 3, may be provided with an activatable and de-activatable beam watching functionality designed to provide information on the display 8 about movements of the laser receiver 10 to a user during adjustment of the reference laser beam 22 with respect to the laser receiver 10. For activating of this functionality, this functionality can be selected from a menu 8a on the touch screen display 8 and the selection can be confirmed by using an <<ok>> button 8b.

It is understood that the above description of the design of a touch screen input for command initiation is of pure illustrative nature, and any equivalent embodiments serving for similar purposes are included in the invention.

FIG. 2 shows an embodiment of an inventive laser system 100 comprising a laser emitter 20, emitting a reference laser beam 22, and an inventive laser receiver 10 as described above related to FIG. 1. Particularly, the laser emitter 20 is provided as a rotating construction laser 20 designed to provide a laser light plane 23 upon rotating the emitted laser beam 22. The laser emitter 20 is provided with communication means 21 designed for, particularly remote, i.e. wireless, communication with communication means 6 of the laser receiver 10.

Thus, an adjustment of the laser plane 23 in response to a movement of the laser receiver 10 with respect to the laser plane 23 can be automated, requiring one person 5 or being fully automated, so that even no operating person may be required.

As part of such a laser system 100, it can be advantageous if the laser receiver 10 is provided with input buttons 9a to 9f as shown in FIG. 1. These input or command buttons 9a to 9f can be provided instead of a touch screen 8 or additionally to the touch screen display 8. The command or input buttons 9a to 9f can be arranged in a button field 9 as shown in FIG. 1. The input buttons 9a to 9f may be correlated to functionalities, which can be equivalent to the ones of the touch screen display 8 as described above or can cover additional functionalities, they also can serve to navigate through menus presented on the display.

In the illustrated embodiment input buttons for navigation through menus are given: direction buttons 9b; a confirmation button 9*a*; a decreasing button 9*c* and an increasing button 9*d* for decreasing and increasing, i.e. loudness of the loudspeaker, brightness/contrast of the display, light intensity of the laser beam, rotation velocity of the laser beam and so on, depending on the selected functionality given in the menu and shown on the display; a focusing button 9*e* and a defocusing button 9*f* for focusing and defocusing the laser beam.

Generally, command input means of the laser receiver 10 and/or the laser emitter may be provided in a manner similar to the design of known computer game control devices. Buttons, a joystick or touch-screen symbols may be provided, indicating directions and/or speed of the movement of the reference laser beam 22 and/or acceleration or deceleration of the rotating speed of the rotating laser beam, allowing for user inputs for laser beam adjustment. Upon short activation of an input command, the responding adjustment speed may be slow, but increase with longer activation of the input command.

Figure 3:
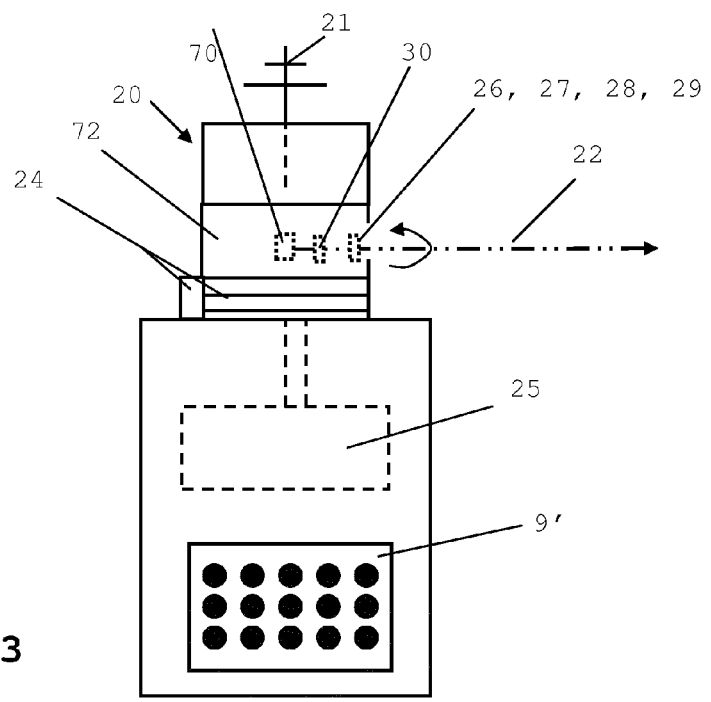
FIG. 3 shows a laser of an inventive laser system.

FIG. 3 shows a laser emitter 20, particularly a rotating construction laser 20 having a laser source 70 and equipment 72 for rotating the generated laser beam 22 in the known manner. According to the shown embodiment, the laser emitter 20 is provided with a control unit 25 having an adjustment unit 24 for adjusting a rotating speed of the reference laser beam 22 and/or a tilt of the reference light plane 23 generated by the emitted laser beam 22 and/or an elevation of the reference light plane 23 generated by the emitted laser beam 22 and or a focus of the laser beam 22 and/or the intensity of the laser light output.

For focusing and intensity purposes the laser emitter is provided with a switchable lens 27, a motor-controlled collimating lens 28 and/or another adjustable lens 29, for varying focusing or defocusing of the reference laser beam 22. Further one or more variable filter can be provided as shown exemplarily by index 30. Such lenses and filter are provided on the out-going beam path alone or in combination. They are adjustable, i.e. focusing and defocusing of the laser beam 22 and increasing and decreasing of the laser light intensity can be adjusted by remote control or by command input using input means 9' of the laser emitter 20.

The control unit 25 is connected to the communication means 21 of the laser emitter 20, allowing for correlation of the adjustment with communicated signals from the laser receiver 10, in particular in response to signals of the photo sensor 1 and the acceleration sensor 4 of the laser receiver 10. Particularly correlation with movements of the laser receiver 10, as well as accelerations and directions of movement of the laser receiver are used for adjustment operations. That means i.e. sideward, upward and downward movements of the laser receiver 10 can be used as command signals for the laser emitter 20 for an sideward, upward, downward adjustment of the laser beam. A tilt of the laser receiver 10 can be translated into an according tilt in an according direction of the laser light plane 23 generated by the rotating laser beam 22. Moving the laser receiver 10 in circles with a defined speed can adjust the rotating speed of the laser beam 22. Is a distance sensor included in the laser system 100 too, a movement of the laser receiver 10 toward the laser emitter 20 can be translated into a defocusing of the laser beam 22, a movement away from the laser emitter 20 can be translated into a focusing of the laser beam or vice versa. These are only a few examples of a possible control of the laser adjustment by movement of the laser receiver. Further and different correlations between movements of the laser receiver 10 and adjustments of the laser 20/laser beam 22 are possible and are also included in the scope of this invention.

Advantageously, the control unit 25 is further provided with a search functionality (not shown) in order to relocate the laser receiver 10 by a reorientation of the laser beam, if the optical contact between the laser receiver 10 and the laser emitter 20 is lost.

The laser emitter further is provided in the known manner with input means 9' for giving directly adjustment commands to the control unit 25 of the laser emitter 20.

Figure 4:
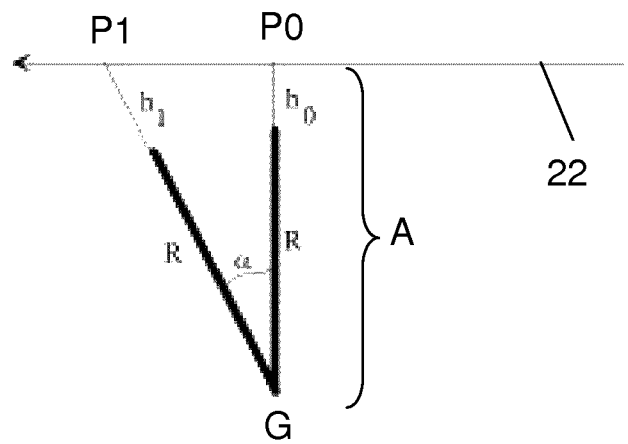
FIGS. 4,5,6 illustrate possibilities for determining ground height using a laser system according to the invention.

In order to determine the orientation of a laser plane e.g. at a construction site precisely it is advantageous to know the height of the laser receiver over ground. As described based on FIG. 4 a laser system according to the invention comprising a laser emitter generating a laser plane—especially comprising a laser emitter formed as a laser rotator or a linear laser emitting a fan like laser plane—and a laser receiver with a linear photo sensor and with an acceleration sensor, allows to determine the ground height A, easily. In case the receiver is mounted on a pole having its foot inclinable fixed on the ground in a pivot point G, determining the ground height A means determining the distance of a marking, preferably the zero position c of the photo sensor of the receiver, to the unknown pivot point G.

In case the laser plane is a level plane 110 (zero plane, horizontal plane), the ground height A of the receiver can be determined by:

Step 1: measurement of the receiver height $h_0$ with the receiver in vertical orientation, perpendicular to the laser beam, wherein height $h_0$ is the distance between the zero position c of the photo sensor of the laser receiver and a first position P0 at the photo sensor stricken by the laser beam 22.

Step 2: measurement of the receiver height $h_1$ with the receiver inclined at angle $\alpha$ about the pivot point G and determining the angle $\alpha$ by the integrated acceleration/inclination sensor, wherein height $h_1$ is the distance between the zero position c of the photo sensor of the laser receiver and a second position P1 of the photo sensor stricken by the laser beam 22 in this inclined orientation of the receiver.

The height A of the receiver above the pivot point G ($A=h_0+R$) can be determined according:

$$\cos(\alpha) = \frac{h_0 + R}{h_1 + R}$$

Figure 5:
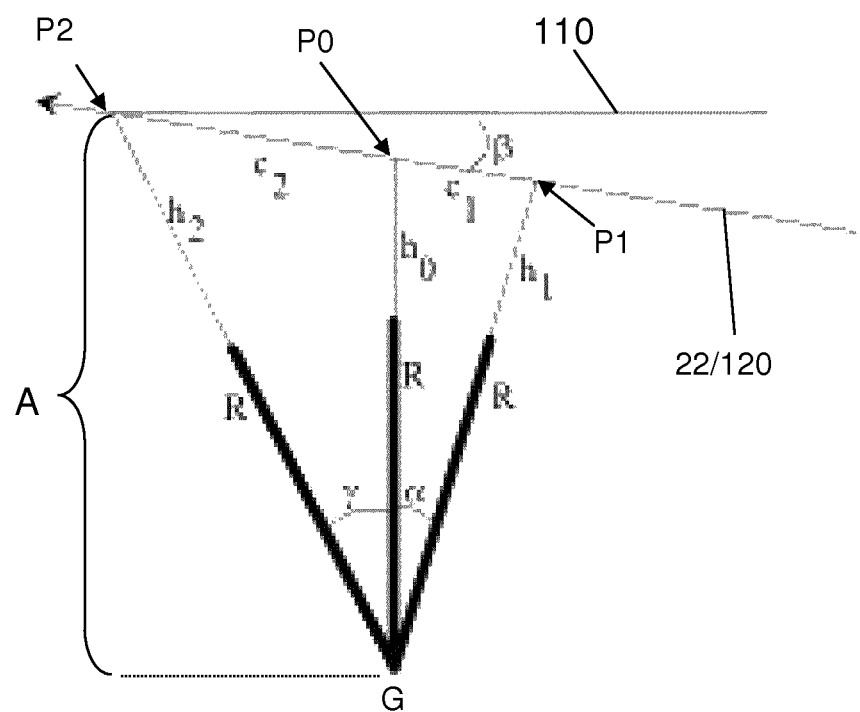

In case the laser plane is an inclined plane 120, e.g. with an inclination angle $\beta$ in relation to level plane 110, laser the height A of the receiver over the ground can be determined by (see FIG. 5):

Step 1: measurement of the receiver height $h_0$ with the receiver in vertical orientation.

Step 2: measurement of the receiver height $h_1$ with the receiver inclined at angle $\alpha$ about the pivot point G and measurement of the angle $\alpha$ by the integrated inclination sensor.

Step 3: measurement of the receiver height $h_2$ with the receiver inclined at angle $\gamma$ about the pivot point and measurement of the angle $\gamma$ by the integrated inclination sensor.

The unknown height of the receiver over the ground can be calculated from the following two sets of equations:

Equation set 1: requiring the 3 measurements described above:

$$c = c_1 + c_2$$

$$c_1^2 = (h_1+R)^2 + (h_0+R)^2 - 2 \cdot (h_0+R) \cdot (h_1+R) \cdot \cos(\alpha)$$

$$c_2^2 = (h_2+R)^2 + (h_0+R)^2 - 2 \cdot (h_0+R) \cdot (h_2+R) \cdot \cos(\gamma)$$

$$c^2 = (h_2+R)^2 + (h_1+R)^2 - 2 \cdot (h_1+R) \cdot (h_2+R) \cdot \cos(\alpha+\gamma)$$

With c1, c2 are distances between the location P0 and the locations P1, P2, respectively of the inclined laser receiver within the inclined laser plane 120.

Equation Set 2:

$$\frac{h_2+R}{\sin(\frac{\pi}{2}+\beta-\alpha)} = \frac{h_1+R}{\sin(\frac{\pi}{2}-\beta-\gamma)}$$

$$\frac{h_0+R}{\sin(\frac{\pi}{2}+\beta-\alpha)} = \frac{h_1+R}{\sin(\frac{\pi}{2}-\beta)}$$

$$\frac{h_0+R}{\sin(\frac{\pi}{2}-\beta-\gamma)} = \frac{h_2+R}{\sin(\frac{\pi}{2}+\beta)}$$

Both equation systems can be solved.
In particular, the second equation system leads to:

$$h_1 \cdot h_2 \cdot \sin(\alpha+\gamma) - h_0 \cdot (h_2 \cdot \sin\gamma + h_1 \cdot \sin\alpha) + R \cdot ((h_1+h_2) \cdot \sin(\alpha+\gamma) - (h_0+h_2) \cdot \sin\gamma - (h_0+h_1) \cdot \sin\alpha) + R^2 \cdot (\sin(\alpha+\gamma) - \sin\gamma - \sin\alpha) = 0$$

This is a quadratic equation in R. As it can be seen 13 drops out and the equation can be solved straight forward.

The inclination angle β between the level plane 110 and the inclined plane 120 can be determined as well. Using the first equation of the second set of equations, the angle β can be computed according $$\tan\beta = \frac{h_0 + R - (h_2 + R) \cdot \cos\gamma}{(h_2 + R) \cdot \sin\gamma}$$

In case of a known angle β at the position of the receiver, the equation above can be used to check or adjust the linearisation/scaling accuracy of the receiver. Alternatively, knowing the angle β, the second set of equations requires only 2 measurements according to the 2nd equation of the 2nd set.

This method can also be used reversed. In case the receiver is placed at a known height R, the inclination angle α can be determined.

When the receiver is placed along the coordinate axis of the emitter (e.g. the x-axis or the y-axis) and using this method, the grade angle in that axis direction can be determined. This allows for determination of the grade of a non grade laser (e.g. normal self leveling laser with the leveling in the selected axis direction set to manual mode).

Figure 6:
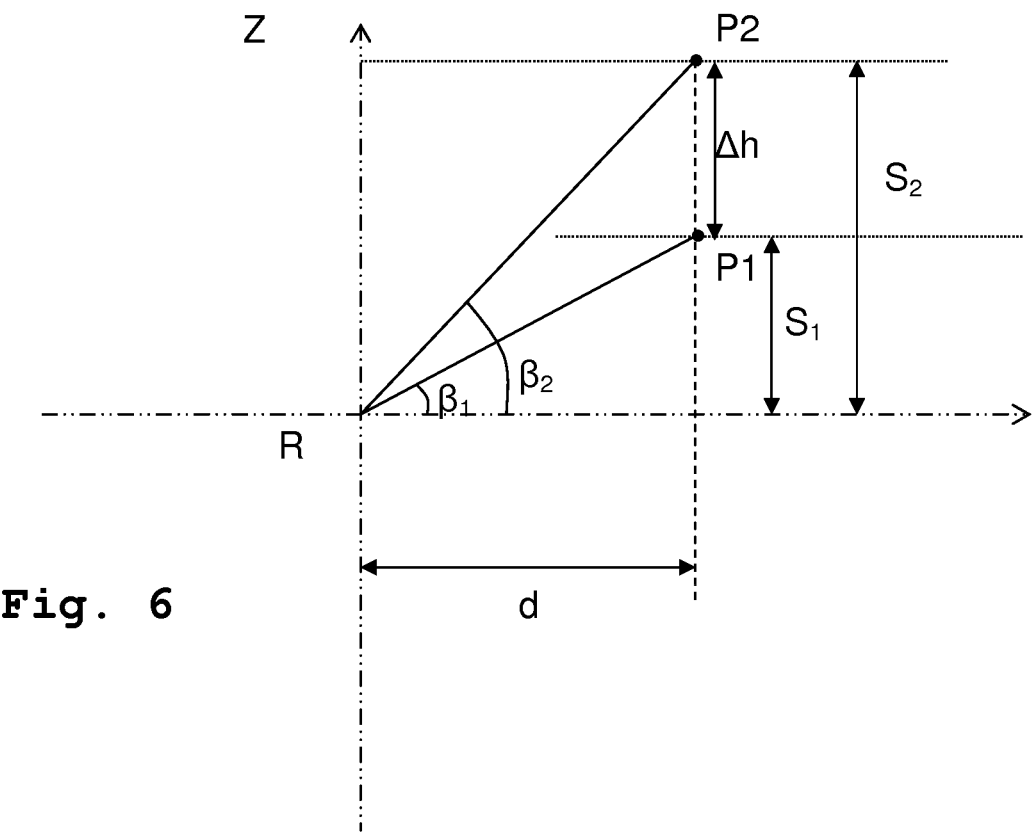

Combining the measurement methods positioning and ground height determination, it is possible to measure the 3D coordinates of a linear receiver by measurement of the inclination angle of the receiver above it's pivot point G on the ground combined with 2 planes (see FIG. 6).

Step 1: Measurement of the receiver height S1 at an intercept P1 with a first laser plane having a first inclination angle β1 with respect to the level plane (in case first plane is the level plane β=0).

Step 2: Measurement of the receiver height $S_2$ at intercept P2 with a second plane having second inclination angle β2 with respect to the level plane.

Having measured the difference Δh between height S1 and S2 of the two planes and knowing the inclination angles β, β' of the two laser planes at the position of the receiver, the distance d to the emitter can be determined (Triangles between the emitter and the intercepts P1, P2 of the receiver with the two planes are described completely by the two angles β, β' and heights S1, S2 and the difference of the heights Δh). Likewise, with known triangle the heights $S_1$ and $S_2$ at which the laser plane strikes the receiver to a level plane can be determined without knowledge of the emitter plane equations by the receiver using the following equations:

$$\tan\beta_i = \frac{S_i}{\sqrt{(x_R^2 + y_R^2)}} \text{ and}$$

$$d = \sqrt{(x_R^2 + y_R^2)} \text{ and}$$

$$a_i \cdot x_R + b_i \cdot y_R + (S_i) = 0$$

Whereby a laser plane i generated by the laser emitter through its origin R can in general be described by:

$$a_i \cdot x + b_i \cdot y + z = 0,$$

within the emitter based coordinate system (X, Y, Z) centered in the origin of the laser emitter and the aperture the laser beam leaves the emitter, respectively. In this equation $a_i$, $b_i$ are known parameters of the laser plane (derived from the inclination sensors/grade sensors of the laser emitter having an accuracy in the range of arcseconds) with i denoting the plane number (i=1 or i=2), and wherein the z-coordinate gives the relative height $h_i$ measured from the laser exit aperture R of the laser emitter within the emitter based coordinate system.

Being able to derive the ground height of the laser receiver and the laser plane at the location of the laser receiver, respectively, allows for a even more precise determination, adjustment and re-adjustment of the laser plane.

What is claimed is:

1. A laser system generating a reference laser light plane of high accuracy for stake out and marking purposes, the laser system comprising a laser emitter and in distance thereof a laser receiver;

the laser emitter comprising:
    a laser source for emitting a laser beam and equipment for rotating the emitted laser beam for providing a reference laser light plane or for emitting a fan like laser beam,
    the laser emitter further comprises a communication signal transceiver and a control unit connected to the communication signal transceiver in order to communicate with the laser receiver;

the laser receiver comprising:
    output means for providing information to a user,
    a communication signal transceiver for communicating with the laser emitter,
    a laser light photo sensor having a zero position (z) and being designed to detect the reference laser beam of the laser emitter and to provide an electrical output signal when illuminated by said reference laser beam,
    an acceleration sensor designed to provide an electrical output signal indicating a movement of the laser receiver together with an indication of a direction and/or an acceleration, and a circuitry, which is connected to the output means, to said photo sensor and to said acceleration sensor, wherein the circuitry of the laser receiver being designed to derive from the electrical output signal of the photo sensor a relative position between the detected laser beam and the zero position (z) of the laser receiver and optionally based on this a relative position of the laser beam and a reference point of the laser receiver, and wherein at least one of the circuitry of the laser receiver and the control unit of the laser emitter being designed to weight the information derived from the electrical output signal of the acceleration sensor, wherein weighting criteria are set by a user for determining the accuracy the laser receiver should work with or the sensitivity the laser receiver should act with in respect of the movements of the laser receiver, and the circuitry of the laser receiver being designed to initiate an automated action adapt to said weighted information;

wherein the control unit of the laser emitter is provided with an adjustment unit and is designed to adjust and/or re-adjust the laser plane emitted by the laser emitter in automatic response to the movement of the laser receiver detected by the acceleration sensor, wherein the acceleration sensor is configured to generate an electrical output signal according to the detected movement, which electrical output signal is optionally weighted by the circuitry of the laser receiver or the control unit of the laser emitter according to the set weighting criteria, and wherein adjustment comprises at least one of:

a rotating speed of the emitted laser beam rotated by the equipment of the laser emitter to provide a reference laser light plane; or intensity of the laser light.

2. The laser system according to claim 1, wherein the laser emitter is a rotating construction laser designed to provide a laser light plane upon rotating the emitted laser beam, and/or designed to provide a fan like laser light plane upon oscillation.

3. The laser system according to claim 1, wherein the acceleration sensor is designed as a three-axis acceleration sensor, to detect movements and accelerations of the laser receiver in three different spatial directions and wherein at least one of the circuitry of the laser receiver and the control unit of the laser emitter is designed to derive a velocity and/or an estimated end position of the movement of the laser receiver from the electrical output signal of the acceleration sensor.

4. The laser system according to claim 1, wherein adjustment comprises further:

tilt of the reference light plane generated by the emitted laser beam;

elevation of the reference light plane generated by the emitted laser beam; and focusing/defocusing of the laser light beam.

5. The laser system according to claim 1, wherein the laser emitter is designed to use the movement, in particular the acceleration, the movement direction and the movement velocity of the leaser receiver as it is derived by using the output signals of the acceleration sensor of the laser receiver, as command signals for the adjustment operations.

6. The laser system according to claim 1, wherein at least one of the circuitry of the laser receiver and the control unit of the laser emitter is pre-programmed with various selectable weighting criteria and optionally or alternatively programmable by the user with respect to the weighting criteria according to current requirements by the means of input means;

wherein the pre-programmed weighting criteria are out of the group comprising at least:

thresholds regarding the movement acceleration dependent of the movement direction, thresholds regarding the movement velocity dependent of the movement direction, thresholds regarding the movement distance of the laser receiver within a predetermined time and dependent of its movement direction, thresholds regarding the movement acceleration independent of the movement direction, thresholds regarding the movement velocity independent of the movement direction, thresholds regarding the movement distance of the laser receiver within a predetermined time and independent of its movement direction, and a threshold regarding a fault of the determined orientation of the laser plane calculated in dependence of a determined movement.

7. The laser system according to claim 1, wherein the system is designed to work at least one operating mode, wherein the operating mode is one of a group of operating modes comprising at least: grade lock mode, line lock mode, plane lock mode, tracking mode, beam catching mode, laser control mode; and wherein the weighting of the information derived from the electrical output signal of the acceleration sensor being dependent on the selected/activated operating mode.

8. The laser receiver according to claim 1, wherein the system is configured in a way that the automated action initiated by the circuitry of the laser receiver and adapted to the weighted information are at least one out of the group comprising at least:

generating an output signal indicating the derived relative position between the detected laser beam and the zero position of the laser light photo sensor of the laser receiver, derived from the electrical output signal of the photo sensor and sending it to a connected output means;

generating an output signal indicating the derived relative position between the detected laser beam and the zero position of the laser light photo sensor of the laser receiver, derived from the electrical output signal of the photo sensor and correcting said output signal as a function of the electrical output signal of the acceleration sensor and sending it to a connected output means;

sending an alarm signal to a connected output means; and sending a command "stop the laser emission" to a connected output means.

9. The laser system according to claim 7, wherein the laser emitter is provided with at least one of:

a switchable lens, a motor-controlled collimating lens, or a liquid lens for varying focusing or defocusing of the emitted laser beam.

10. The laser system according to claim 7, wherein the laser emitter is provided with filter means for varying the intensity of the emitted laser light.

11. The laser system according to claim 1, wherein the circuitry of the laser receiver and/or the control unit of the laser emitter are designed to determine the ground height (A, S1, S2) of the laser receiver based on the output signals of the laser light photo sensor and the acceleration sensor provided when illuminated by the laser beam of the laser emitter at at least two different inclination angles of the laser receiver with respect to the ground.

12. A method to determine the orientation of a laser plane comprising:
  providing a laser system according to claim 1 with a laser emitter and a laser receiver with a photo sensor;
  placing the laser receiver with its photo sensor in distance to the laser emitter
    detecting with said photo sensor of the laser receiver an incidence of a rotating laser light beam emitted by the laser emitter, wherein the photo sensor of the laser receiver has a defined zero position (z) and provides an electrical output signal caused by said illumination to at least one of the circuitry of the laser receiver and the control unit of the laser emitter;
  deriving by using said circuitry of the laser receiver a relative position between the detected laser beam and the zero position (z) and optionally based on this a relative position of the laser beam and a reference point of the laser receiver,
  detecting with an acceleration sensor any movement of the laser receiver and providing an electrical output signal to at least one of the circuitry of the laser receiver and the control unit of the laser emitter, said electrical output signal indicating said movement and indicating a direction and an acceleration of said movement, and
  weighting the information derived from the electrical output signal of the acceleration sensor and initiating an automated action adapt to said weighted information, wherein weighting criteria are set by a user in order to determine how accurate the laser receiver should work or how sensible the laser receiver should act with respect to the movement of the laser receiver, and wherein based on said weighted information the control unit of the laser emitter by means of an adjustment unit adjust and/or re-adjust the laser plane emitted by the laser emitter in response to movement of the laser receiver.

13. The method according to claim 12, wherein during the adjustment at least one function out of the following group of functions of the laser emitter are adjusted:
  a tilt of the reference light plane generated by the emitted laser beam;
  an elevation of the reference light plane generated by the emitted laser beam;
  a rotating speed of the rotating laser beam;
  a focus of the laser beam; and
  an intensity of the laser light.

14. The method according to claim 12, wherein adapted to the weighted information at least one automated action is carried out, wherein the automated action is one out of the group comprising at least:
  generating an output signal indicating the derived relative position between detected laser beam and laser receiver, derived from the electrical output signal of the photo sensor and sending it to a connected output means;
  generating an output signal indicating the derived relative position between detected laser beam and laser receiver, derived from the electrical output signal of the photo sensor and correcting said output signal as a function of the electrical output signal of the acceleration sensor and sending it to a connected output means;
  sending an alarm signal to a connected output means; and
  sending a command "stop the laser emission" to a connected output means.

15. The method according to claim 12, wherein an operating mode is selected and/or activated by the user out of a group comprising at least: grade lock mode, line lock mode, plane lock mode, tracking mode, beam catching mode, laser control mode.

16. A method to control a laser emitter within a laser system according to claim 13, by the means of a laser receiver, the method comprising:
  providing in a storage means predetermined movements of the laser receiver together with characteristic criteria of these predetermined movements for identifying those predetermined movements and together with allocated "command signals", which "command signals" are designed to activate adjustment operations in the adjustment unit of the laser emitter;
  moving the laser receiver in a predetermined way;
  detecting the movement of the laser receiver by the accelerations sensor of the laser receiver and generating the according electrical output signal;
  indicating the movement together with the movement direction and the movement acceleration of the laser receiver,
  sending this electrical output signal at least to one of the circuitry of the laser receiver and the control unit of the laser emitter in order to check whether it meets the criteria of one of stored predetermined movements,
  in case it meets not the criteria of one of the predetermined movements, sending an according message to the user by using the output means,
  in case it meets the criteria of one of the predetermined movements converting the predetermined movement in the allocated "command signal" and sending said allocated "command signal" derived from the electrical output signals of the acceleration sensor to the control unit and the adjustment unit, respectively of the laser emitter; and
  adjusting the functions of the laser emitter based on the incoming "command signals" by using the adjustment unit of the laser emitter.

17. The method according to claim 12, further comprising the determination of the height (A) of the laser receiver over ground, wherein said determination comprises at least the following steps:
  ensuring that the laser light plane is orientated horizontally,
  mounting the laser receiver on a pole, the pole having its foot inclinable fixed on the ground in a pivot point G,
  orienting the laser receiver with its photo sensor in vertical position and perpendicular to the laser beam by using the acceleration/inclination sensor,
  determining distance ($h_0$) between the zero position (z) of the photo sensor of the laser receiver and a first position (P0) at the photo sensor stricken by the laser beam,
  inclining the laser receiver at an angle α about the pivot point G and determine the angle α by using the integrated acceleration/inclination sensor,
  determining distance ($h_1$) between the zero position (z) of the photo sensor of the laser receiver and a second position (P1) of the photo sensor stricken by the laser beam in this inclined orientation of the receiver, and
  determining height (A) of the laser receiver over the ground, wherein the height (A) of the receiver above the pivot point G fixed on the ground is $$A = h_0 + R$$

and $$\cos(\alpha) = \frac{h_0 + R}{h_1 + R}.$$

18. The method according to claim 12, further comprising the determination of the height (A) of the laser receiver over ground, wherein the laser plane emitted by the laser emitter has an inclination angle β in relation to a horizontal, level plane; said determination comprises at least the following steps:
- mounting the laser receiver on a pole, the pole having its foot inclinable fixed on the ground in a pivot point G, the distance between the pivot point G and the laser receiver, in particular the zero point (z) of the photo sensor of the laser receiver is R,
- orienting the laser receiver with its photo sensor in vertical position and perpendicular to the laser beam by using the acceleration/inclination sensor of the laser receiver,
- determining distance ($h_0$) between the zero position (z) of the photo sensor of the laser receiver and a first position (P0) at the photo sensor stricken by the laser beam,
- inclining the laser receiver at a first angle α about the pivot point G and determine the angle α by using the integrated acceleration/inclination sensor,
- determining distance ($h_1$) between the zero position (z) of the photo sensor of the laser receiver and a second position (P1) of the photo sensor stricken by the laser beam in this inclined orientation of the receiver,
- inclining the laser receiver at a second angle γ about the pivot point G and determine the angle γ by using the integrated acceleration/inclination sensor,
- determine distance ($h_2$) between the zero position (z) of the photo sensor of the laser receiver and a further position (P2) of the photo sensor stricken by the laser beam in this inclined orientation of the receiver, and
- determining the height (A) of the laser receiver over the ground, based on the_derived data using following two equation sets Equation set 1:

$$c = c_1 + c_2$$

$$c_1{}^2 = (h_1+R)^2 (h_0+R)^2 - 2 \cdot (h_0+R) \cdot (h_1+R) \cdot \cos(\alpha)$$

$$c_2{}^2 = (h_2+R)^2 + (h_0+R)^2 - 2 \cdot (h_0+R) \cdot (h_2+R) \cdot \cos(\gamma)$$

$$c^2 = (h_2+R)^2 + (h_1+R)^2 - 2 \cdot (h_1+R) \cdot (h_2+R) \cdot \cos(\alpha+\gamma)$$

Equation set 2:

$$\frac{h_2 + R}{\sin(\frac{\pi}{2} + \beta - \alpha)} = \frac{h_1 + R}{\sin(\frac{\pi}{2} - \beta - \gamma)}$$

$$\frac{h_0 + R}{\sin(\frac{\pi}{2} + \beta - \alpha)} = \frac{h_1 + R}{\sin(\frac{\pi}{2} - \beta)}$$

$$\frac{h_0 + R}{\sin(\frac{\pi}{2} - \beta - \gamma)} = \frac{h_2 + R}{\sin(\frac{\pi}{2} + \beta)}.$$

19. The method according to claim 18, wherein the inclination angle β between the inclined laser plane and the virtual horizontal, level plane is determined by using the first equation of the second set of equations, and wherein the angle β is computed according:

$$\tan\beta = \frac{h_0 + R - (h_2 + R) \cdot \cos\gamma}{(h_2 + R) \cdot \sin\gamma}.$$

20. The method according to claim 17, wherein the height (A) of the laser receiver over ground is defined as the height of the reference point of the laser receiver over ground or the height of the zero position (z) of the photo sensor of the laser receiver over ground.

21. The laser system according to claim 1, wherein the system comprises a distance measuring unit for determining the distance between the laser emitter and the laser receiver.

22. The method according to claim 17, wherein in addition a distance between the laser emitter and the laser receiver is measured by using a laser distance measuring unit based on the time of flight method and the measured distance is in addition used for determining the height (A) of the laser receiver over ground.

23. The method according to claim 18, wherein the height (A) of the laser receiver over ground is defined as the height of the reference point of the laser receiver over ground or the height of the zero position (z) of the photo sensor of the laser receiver over ground.

24. The method according to claim 18, wherein in addition a distance between the laser emitter and the laser receiver is measured by using a laser distance measuring unit based on the time of flight method and the measured distance is in addition used for determining the height (A) of the laser receiver over ground.

25. The laser system according to claim 4, wherein the laser emitter is designed to use the movement, in particular the acceleration, the movement direction and the movement velocity of the leaser receiver as it is derived by using the output signals of the acceleration sensor of the laser receiver, as command signals for the adjustment operations.

* * * * *